United States Patent
Sugimoto et al.

(10) Patent No.: US 6,774,770 B2
(45) Date of Patent: Aug. 10, 2004

(54) INSTRUMENT PANEL UNIT OF VEHICLE HAVING RADIO SIGNAL RECEIVER

(75) Inventors: Yuji Sugimoto, Okazaki (JP); Tomoyuki Miyagawa, Nukata-gun (JP)

(73) Assignees: Nippon Soken, Inc., Aichi-ken (JP); Denso Corporation, Kariya (JP)

( * ) Notice: Subject to any disclaimer, the term of this patent is extended or adjusted under 35 U.S.C. 154(b) by 172 days.

(21) Appl. No.: 10/216,808

(22) Filed: Aug. 13, 2002

(65) Prior Publication Data

US 2003/0083010 A1 May 1, 2003

(30) Foreign Application Priority Data

Oct. 25, 2001 (JP) ........................................ 2001-327514

(51) Int. Cl.[7] .............................................. B60R 25/10
(52) U.S. Cl. ............................ 340/426.34; 340/426.36; 340/688
(58) Field of Search ....................... 340/426.13, 426.17, 340/426.28, 426.34, 426.36, 442, 447, 539.1, 539.11, 688; 342/443, 446, 457; 343/713

(56) References Cited

U.S. PATENT DOCUMENTS

| 3,896,448 | A | * | 7/1975 | Killen et al. ................. 343/713 |
| 4,023,176 | A | * | 5/1977 | Currie et al. ................ 342/443 |
| 4,300,120 | A | * | 11/1981 | Surman ....................... 340/447 |
| 6,545,599 | B2 | * | 4/2003 | Derbyshire et al. .......... 340/442 |

FOREIGN PATENT DOCUMENTS

| JP | A-8-216735 | 8/1996 |
| JP | A-9-207717 | 8/1997 |

* cited by examiner

Primary Examiner—Van T. Trieu
(74) Attorney, Agent, or Firm—Posz & Bethards, PLC (57) ABSTRACT

An instrument panel unit of a vehicle incorporates a radio signal receiver formed on a circuit board which is fixed over a meter circuit board in parallel thereto within a meter housing. It is disposed so that an antenna inlet on the circuit board is located in one outer region among longitudinally trisected regions of the meter circuit board. The meter circuit board works efficiently as additional part of antenna, thereby improving the signal receiving performance inclusive of the antenna gain of the receiver.

11 Claims, 8 Drawing Sheets

INSTRUMENT PANEL UNIT OF VEHICLE HAVING RADIO SIGNAL RECEIVER

CROSS REFERENCE TO RELATED APPLICATION

This application is based on and incorporates herein by reference Japanese Patent Application No. 2001-327514 filed on Oct. 25, 2001.

FIELD OF THE INVENTION

The present invention relates to an instrument panel unit of a vehicle, which incorporates a radio signal wave receiver such as a keyless entry receiver.

BACKGROUND OF THE INVENTION

Recent automobiles have radio signal receivers besides car radio receivers. These receivers are typically used for keyless entry systems. The keyless entry system is a vehicle control system for implementing door lock/unlock, etc. It includes a keyless entry receiver equipped on the vehicle and a keyless entry transmitter concealed in the key of a vehicle, etc. held by a vehicle driver.

The keyless entry transmitter is activated by the driver to send out a modulated signal including an ID code unique to the transmitter and an operation command code. The keyless entry receiver which receives a radio signal demodulates the signal to determine whether it is from the paired transmitter. In response to the signal relevancy, it releases a control signal derived from the operation command code to a corresponding ECU of vehicle by which the door lock/unlock, engine start, etc. is carried out.

The keyless entry system is generally based on a weak radio signal of 300-MHz band. The keyless entry receiver in the vehicle includes a radio signal antenna which is integrated with a circuit board of the keyless entry receiver.

In order for the keyless entry system to operate reliably in response to the signal from the paired keyless entry transmitter operated by the driver who is out of the vehicle, it is necessary for the keyless entry receiver to be sensitive enough to demodulate the radio signal including ID code and operation command code accurately.

JP-A-8-216735 discloses an instrument panel unit, with a radio signal receiver being incorporated, for indicating the vehicle speed, etc. This instrument panel unit has its radio signal receiver located near the windshield so that the receiver is less subject to the electromagnetic shielding effect of the metallic vehicle body. On the other hand, the keyless entry receiver which is fitted off the vehicle body must be grounded to the vehicle body through a wire harness. It is difficult to have low-impedance grounding. Therefore, the keyless entry receiver suffers fluctuation of antenna gain and directivity caused by nearby instrument circuit boards even though the receiver has an improved environment of signal reception.

On this account, the above instrument panel unit is impractical in attaining the adequate signal receiving performance.

SUMMARY OF THE INVENTION

In view of the foregoing situation, it is an object of the present invention to provide an instrument panel unit of a vehicle, which has a radio signal receiver that provides adequate and practical signal receiving performance.

According to the present invention, an instrument panel unit of a vehicle comprises a meter housing, a display section provided in the meter housing, a meter circuit provided in the meter housing and formed on a meter circuit board, and a radio signal receiver provided in the meter housing and formed on a receiver circuit board connected with an antenna.

The receiver circuit board has an inlet for the antenna in one of outer regions of the meter circuit board, at an upper side of the meter circuit board, or right above an electrically separated signal receiving pattern formed on the meter circuit board.

The antenna has segments, which extend in parallel to a surface of the meter circuit board, with a part of the antenna segments nearer to the inlet being extended in a longitudinal direction of the meter circuit board.

The meter circuit board has a circuit pattern, which is laid along a whole rim section of the meter circuit board to form a closed-loop radio signal receiving pattern at least with respect to RF circuit characteristics.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in further detail with reference to various embodiments.

(First Embodiment)

Figure 1:
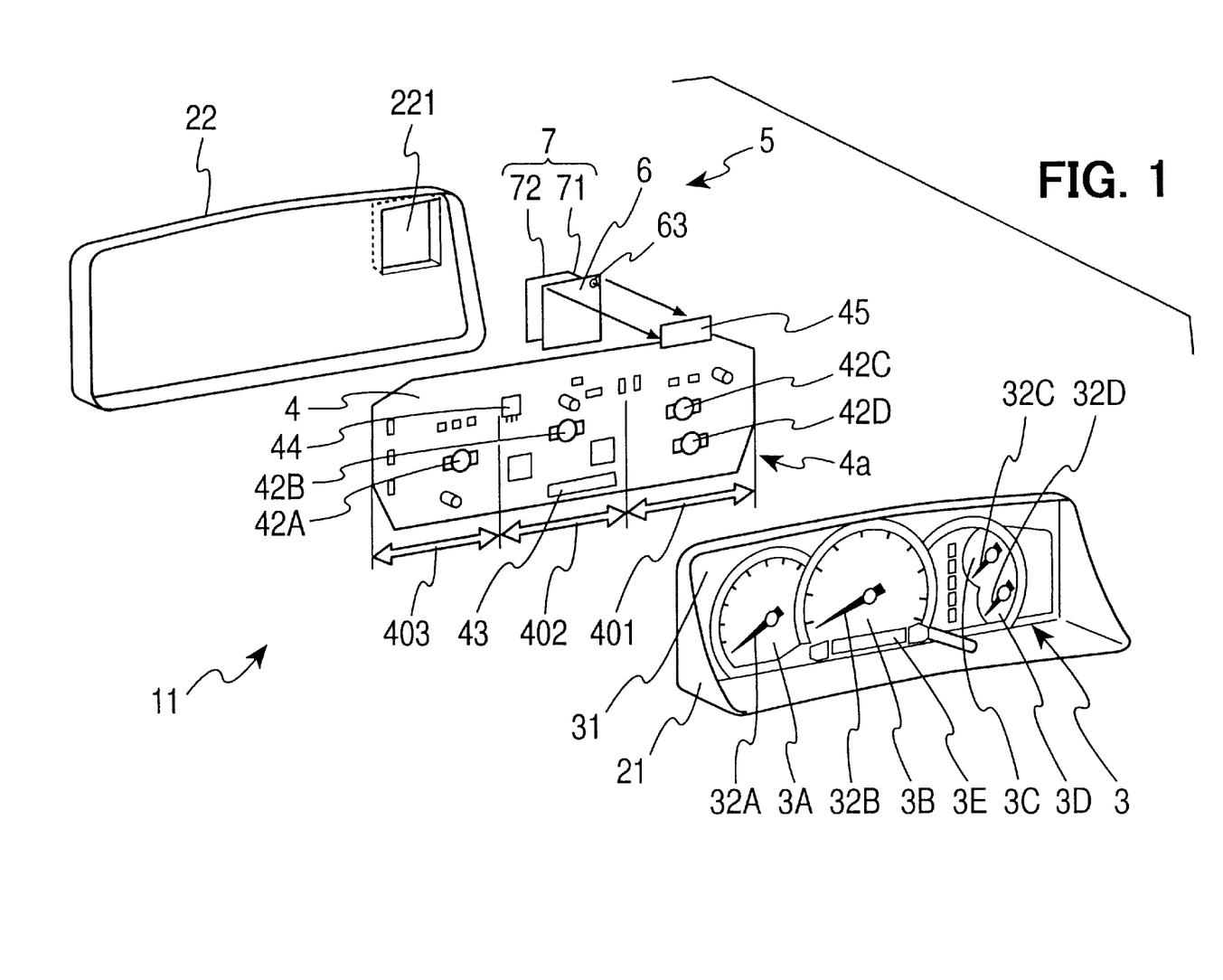
FIG. 1 is an exploded perspective view of an instrument panel unit, with a keyless entry receiver being incorporated, based on a first embodiment of this invention.

Referring first to FIG. 1, an instrument panel unit 11 has an front housing 21 and rear housing 22 which are fitted on the dashboard of a vehicle. The front housing 21 includes a display panel 3 to be viewed by a vehicle driver. The display panel 3 includes meters 3A, 3B, 3C, 3D and 3E for indicating various vehicle operating conditions such as travel speed, etc. Placed behind the front housing 21 are a meter circuit board 4 and a keyless entry radio signal receiver 5 having its circuit board 6 attached to the corner section of the meter circuit board 4.

Among the meters, a tachometer 3B is located at the center of the display panel 3. It is adjoined by a speedometer 3A on the left and by a small coolant temperature gauge 3C and fuel gauge 3D on the right. These meters 3A–3D have their pointers 32A, 32B, 32C and 32D driven by respective stepping motors 42A, 42B, 42C and 42D located behind a display board 31 through the shafts which penetrate the display board 31, thereby indicating the respective kinds of values in terms of the rotational angles of the pointers. A liquid-crystal trip meter 3E is located below the tachometer 3B.

Based on this meter layout, the instrument panel unit 11 has an elongate shape along the width of vehicle. The rear housing 22 has a protruding section 221, in which the keyless entry receiver 5 is encased.

Figure 2:
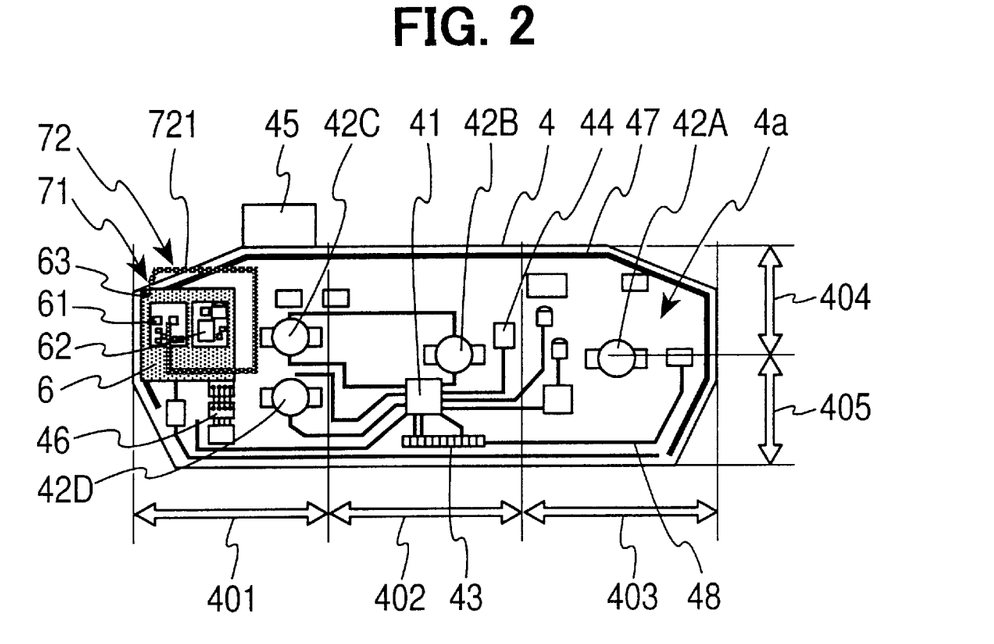
FIG. 2 is a rear view of the interior of the instrument panel unit.
Figure 3:
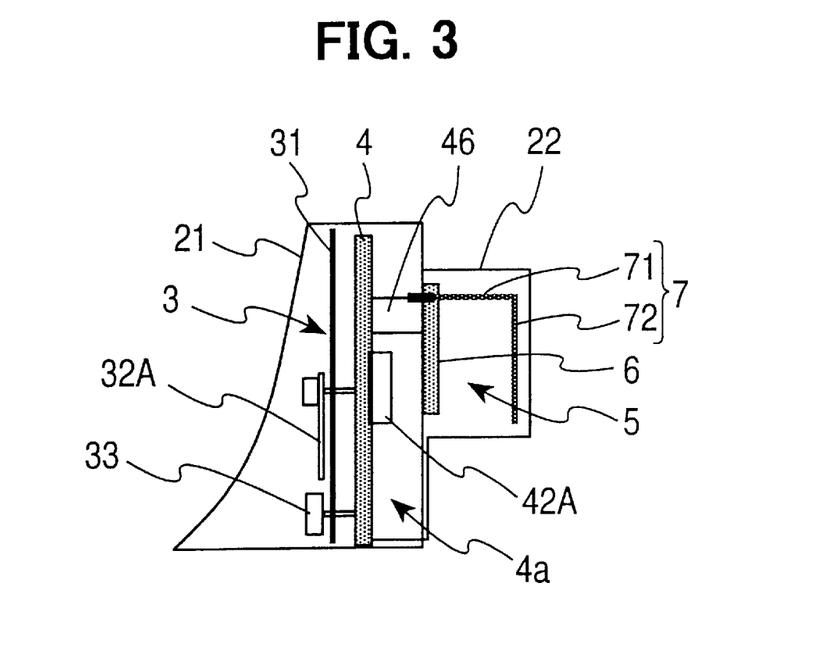
FIG. 3 is a side view of the interior of the instrument panel unit.

FIG. 2 shows the back of the instrument panel unit 11, with the rear housing 22 being removed, and FIG. 3 shows the cross sectional structure of the instrument panel unit 11.

The meter circuit board 4 includes various component parts 41, 42A–42D, 43, 44, 45 and 46 which form a meter circuit 4a for operating the display panel 3. These component parts 41–46 include a control CPU 41, stepping motors 42A–42D, a liquid crystal display device 43 which forms the trip meter 3E, a power regulator 44 which supplies power voltages to these parts, and a connector 45 which is connected to a wire harness. The meter circuit board 4 is connected to the battery and other controllers through wire harnesses. There is another connector 46 which connects between the meter circuit board 4 and the keyless entry receiver 5.

The meter circuit board 4 has on its front surface circuit patterns 47 and 48, which cover the most board area for interconnecting the parts 41–46. The circuit pattern 47 is a wide ground line laid along the upper edge and the right and left edges of the circuit board 4. The circuit patterns 48 are signal lines laid mainly in the longitudinal direction of the circuit board 4. Due to the presence of these parts 41–46 and circuit patterns 47 and 48, the meter circuit board 4 has its surface assumed to be covered with a metallic sheet in a sense of RF circuit characteristics.

The keyless entry receiver 5 has its circuit board 6 connected with an antenna 7 for receiving a radio signal from the keyless entry transmitter. The keyless entry receiver 5 and keyless entry transmitter form in pairs a keyless entry system.

Figure 4:
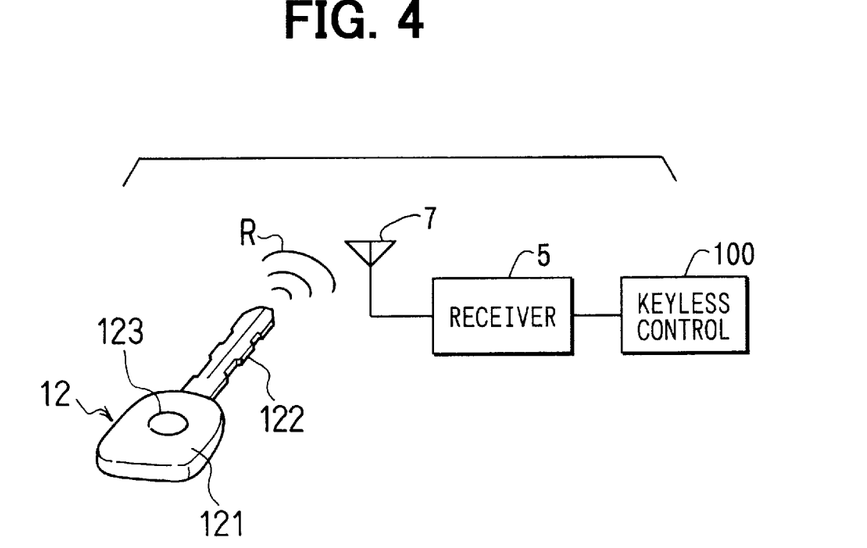
FIG. 4 is a diagram showing the keyless entry transmitter which pairs with the keyless entry receiver.

FIG. 4 shows a keyless control system which uses a keyless entry transmitter 12. The keyless entry transmitter 12 is embedded in a bow 121 of a key of the vehicle. When a press button 123 fitted on the bow 121 is manipulated by the driver, the transmitter 12 sends out a modulated radio signal R which carries an ID code unique to the transmitter 12 and an operation command code.

The keyless entry receiver 5 includes a demodulation circuit section 61 and signal process circuit section 62 on the circuit board 6. A radio signal received by the antenna 7 is conducted through an antenna inlet 63 to the demodulation circuit section 61. The demodulation circuit section 61 demodulates the input radio signal. The signal process circuit section 62 determines whether the ID code in the demodulated signal is specific to the paired keyless entry transmitter 12. Upon determining the relevancy of ID code, the signal process circuit section 62 releases a control signal corresponding to the operation command code in the demodulated signal to a keyless control unit 100, that is, an ECU of the vehicle, so that the door lock/unlock operation, engine start operation, etc. are performed.

The antenna 7 is of the mono-pole type. It has a vertical section 71 which extends from the antenna inlet 63 on the circuit board 6 into the rear housing 22, and a horizontal section 72 which extends in parallel to the circuit board 6 at a constant spacing from the board surface and bends to have a generally square profile.

The receiver circuit board 6 is fixed over the meter circuit board 4 in parallel thereto. Accordingly, the horizontal section 72 of the antenna 7 is also parallel to the meter circuit board 4.

The receiver circuit board 6 is located at the left and slightly upper position of the meter circuit board 4 in FIG. 2. The antenna vertical section 71 is located at the top left corner of the meter circuit board 4 where the antenna inlet 63 on the receiver circuit board 6 is located.

The antenna 7 is arranged to have its leading linear segment 721 of the horizontal section 72, which is adjacent to the vertical section 71 at the antenna inlet 63, laid in the longitudinal direction of the meter circuit board 4, i.e., in the horizontal direction of the instrument panel unit 11. The rear housing 22 has its protruding section 221 designed in consideration of the shapes and positions of the receiver circuit board 6 and antenna 7.

Figure 5:
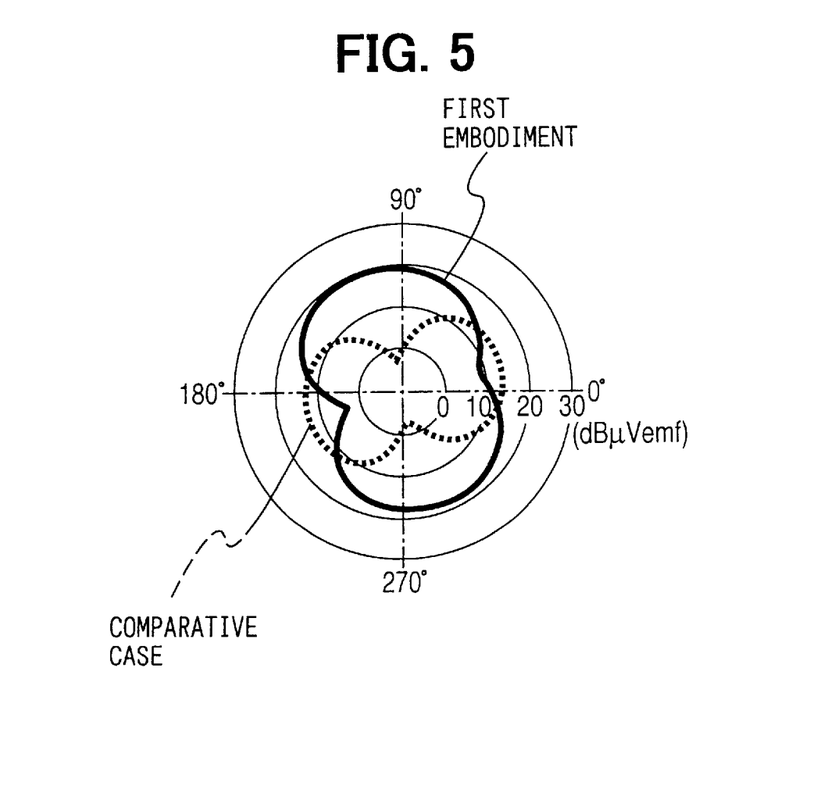
FIG. 5 is a diagram showing comparison of the antenna directivity patterns of the keyless entry receiver.
Figure 6:
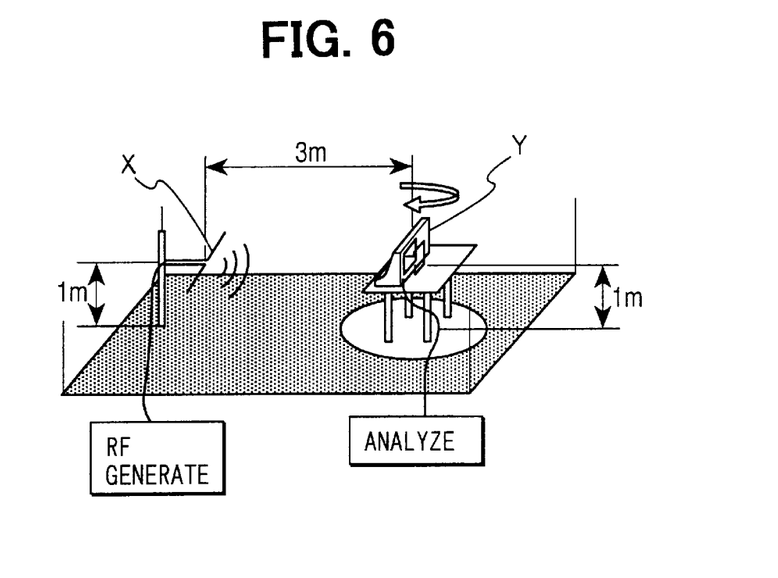
FIG. 6 is a diagram used to explain the antenna directivity measuring facility.

FIG. 5 shows the antenna directivity on a horizontal plane of the keyless entry receiver 5, comparing between the case of the first embodiment where the antenna inlet is located at the longitudinal end of the meter circuit board 4 and the case of a subject of comparison where it is disposed at the longitudinal center. The antenna directivity was measured by the experimentation setup prepared in a radio signal anechoic room as shown in FIG. 6. In this setup, a horizontally polarized wave dipole transmission antenna X is placed at a height of 1 m and an instrument panel unit Y to be tested is placed at a height of 1 m by being spaced out by a distance of 3 m from the transmission antenna X. The transmission antenna X is supplied with a signal of 314 MHz at 55 dBµVemf from an RF signal generator, and the antenna of the unit Y under test receives the radio signal from the transmission antenna X, with the signal reception level being recorded with a spectrum analyzer.

The measurement results shown in FIG. 5 reveal that the instrument panel unit 11 (X) of this embodiment provides the higher antenna gain as compared with the subject of comparison.

Figure 7A:
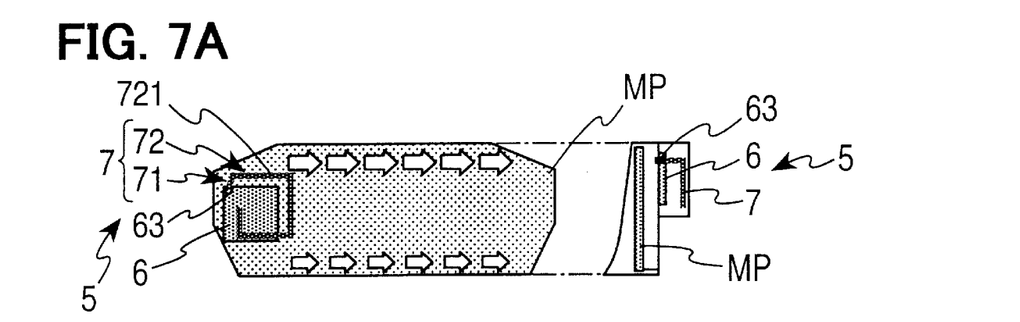
FIGS. 7A and 7B are diagrams of the interior back wall of the instrument panel unit, showing the simulation results of signal receiving performance of the keyless entry receiver.
Figure 7B:
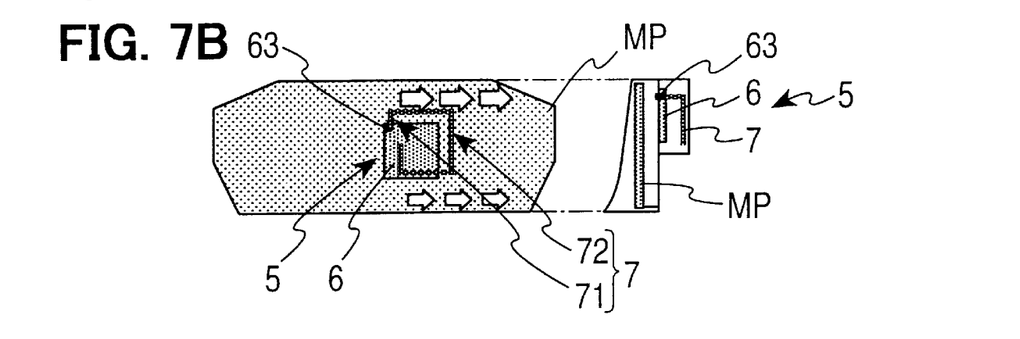

FIGS. 7A and 7B show the results of simulation of the current flowing on a metallic plate MP which is equivalent in shape to the meter circuit board 4 based on the assumption of disposing the keyless entry receiver 5 near the metallic plate MP and feeding an RF signal, which has the same frequency as the signal received by the keyless entry receiver 5, to the antenna inlet 63. In this figure, the width of arrows indicates the RF current density. FIG. 7A is the case of the antenna inlet 63 located at the longitudinal end of the metallic plate MP as in the first embodiment, while FIG. 7B is the case of inlet disposition at the longitudinal center as the subject of comparison.

The RF current fed to the inlet 63 flows through the antenna 7, producing electromagnetic field, which then induces an RF current on the metallic plate MP. On this account, the antenna 7 and the metallic plate MP couple electromagnetically, causing the metallic plate MP to work as additional part of the antenna. Although in this simulation the antenna 7 is a transmission antenna, this principle is applicable to the opposite case of reception by the antenna 7.

The antenna 7 has a higher density current in its segment closer to the inlet 63 and couples strongly in this section with the metallic plate MP. As shown by FIGS. 7A and 7B, the RF current path can be longer along the longitudinal direction of the metallic plate MP by having the position on metallic plate MP facing the antenna inlet 63 nearer to the longitudinal end of the metallic plate MP. In consequence, even though the segment length of antenna 7 is far smaller than the signal wavelength (around 1 m), the keyless entry receiver 5 has a practical antenna segment length close to the signal wavelength based on the presence of the meter circuit board 4.

Figure 8:
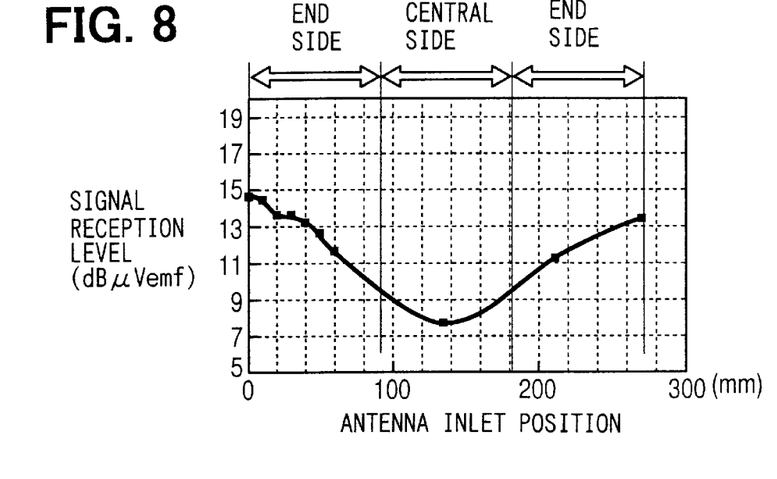
FIG. 8 is a graph used to explain the signal receiving performance of the keyless entry receiver.

FIG. 8 shows the variation of the average signal reception level measured by moving the antenna inlet 63 across the metallic plate MP. The signal reception level is higher and thus the antenna gain is higher as the position of antenna inlet 63 is nearer to the longitudinal end of the meter circuit board 4, i.e., the end of instrument panel unit 11.

Although in this embodiment the meter circuit board 4 is utilized to achieve the highest signal receiving performance by having the antenna inlet 63 located at the longitudinal end of the meter circuit board 4, the location of antenna inlet 63 can be determined flexibly depending on the circuit pattern of the meter circuit 4a. Specifically, the disposition of the antenna inlet 63 so as to face the outer region 401 or 403 among the longitudinally trisected regions 401, 402 and 403 of the meter circuit board 4 will provide a satisfactory result of the signal reception level.

In addition, arranging the antenna segment 721, which is close to the antenna inlet 63 and high in current density out of the horizontal section 72 of the antenna 7, in parallel to the longitudinal direction of the meter circuit board 4 achieves the following effectiveness.

Figure 9:
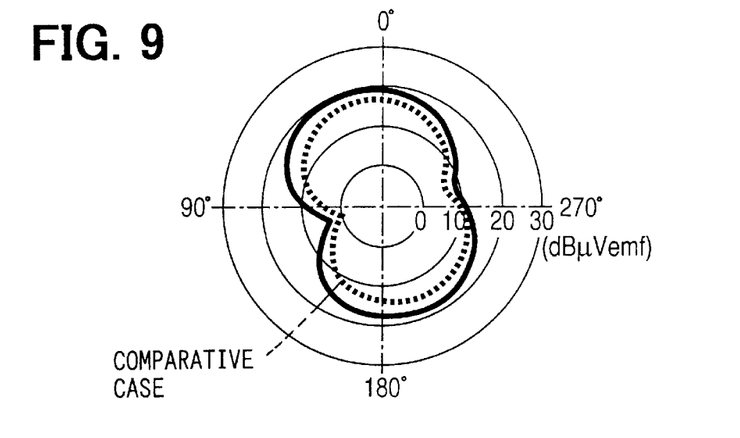
FIG. 9 is a diagram showing comparison of the antenna directivity patterns of the keyless entry receiver.

FIG. 9 shows the antenna directivity, comparing between the first embodiment where the segment 721 adjoining the antenna inlet 63 out of the horizontal section 72 is laid in parallel to the longitudinal direction of the meter circuit board 4 and the case of a subject of comparison where the segment 721 is set to be orthogonal to the longitudinal direction of the meter circuit board 4. This comparison result reveals that this embodiment achieves the higher antenna gain as compared with the subject of comparison.

Figure 10:
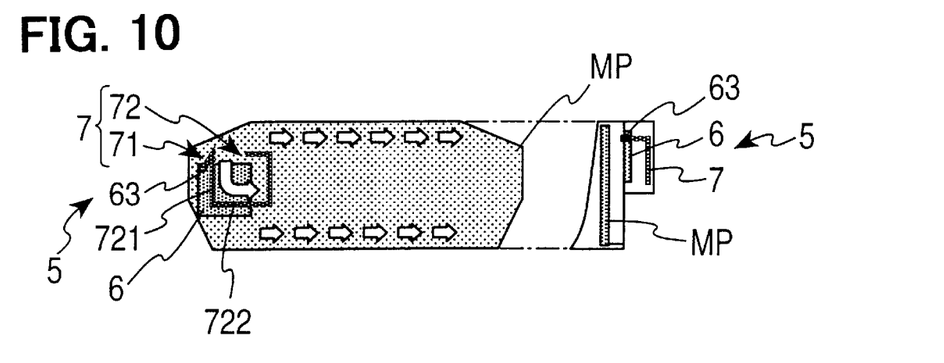
FIG. 10 is a diagram of the interior back wall of the instrument panel unit, showing the simulation result of signal receiving performance of the keyless entry receiver.

FIG. 10 shows the result of simulation of the current flowing on a metallic plate MP which is equivalent in shape to the meter circuit board 4 based on the assumption of disposing the keyless entry receiver 5 near the metallic plate MP and feeding an RF signal, which has the same frequency as the signal received by the keyless entry receiver 5, to the antenna inlet 63.

Differently from this embodiment, the antenna 7 is arranged to have its linear segment 721 of the horizontal section 72, which is adjacent to the antenna inlet 63, laid in the direction orthogonal to the longitudinal direction of the metallic plate MP. The linear segment 721 is followed by a bend and by another linear segment 722 which is laid in parallel to the longitudinal direction of the metallic plate MP.

The segment 721 of high density current is vertical in the arrangement of FIG. 10, resulting in a smaller current flowing in the longitudinal direction of the meter circuit board 4. In this embodiment of FIG. 7A, the segment 721 adjoining the antenna inlet 63 out of the horizontal section 72 of the antenna 7 is laid in the longitudinal direction of the metallic plate MP and the segment 721 of high density current is horizontal, resulting in a larger current flowing in the longitudinal direction of the metallic plate MP. Consequently, the full length of the meter circuit board 4 can be utilized to provide an adequate antenna segment length according to this embodiment.

In addition, disposing the antenna inlet 63 at the upper position of the meter circuit board 4 as shown in FIG. 2 achieves the following effectiveness. In FIG. 7A, the RF current flowing in the upper section of the metallic plate MP is larger than the current flowing in the lower section, which is conceivably due to the electromagnetic coupling of the antenna 7 with the metallic plate MP at its upper section. The instrument panel unit 11 is located below the lower edge of glass windshield, and a large proportion of the radio signal is blocked by the metallic body before it reaches the lower section of the instrument panel unit 11. Based on the disposition of the antenna inlet 63 at the upper position, the signal receiving performance can be improved. This property is applicable commonly to instrument panel units having its antenna inlet 63 located at the longitudinal center of the meter circuit board as shown in FIG. 7B.

Although in this embodiment the circuit patterns 47 and 48 are utilized to substitute for a metallic sheet, an alternative design is to use a multi-layer circuit board which includes an entire conductor layer separately from the circuit patterns 47 and 48. In this case, the signal receiving performance can be improved irrespective of the circuit pattern of the meter circuit 4a.

Although the antenna inlet 63 is located at the upper position of the meter circuit board 4 so that the meter circuit board 4 functions as a metallic sheet in the best signal reception condition, disposing the antenna inlet 63 in the upper region 404 among the vertically bisected regions 404 and 405 of the meter circuit board 4 will provide a function of metallic sheet in a fairly satisfactory signal reception condition.

(Second Embodiment)

Figure 11:
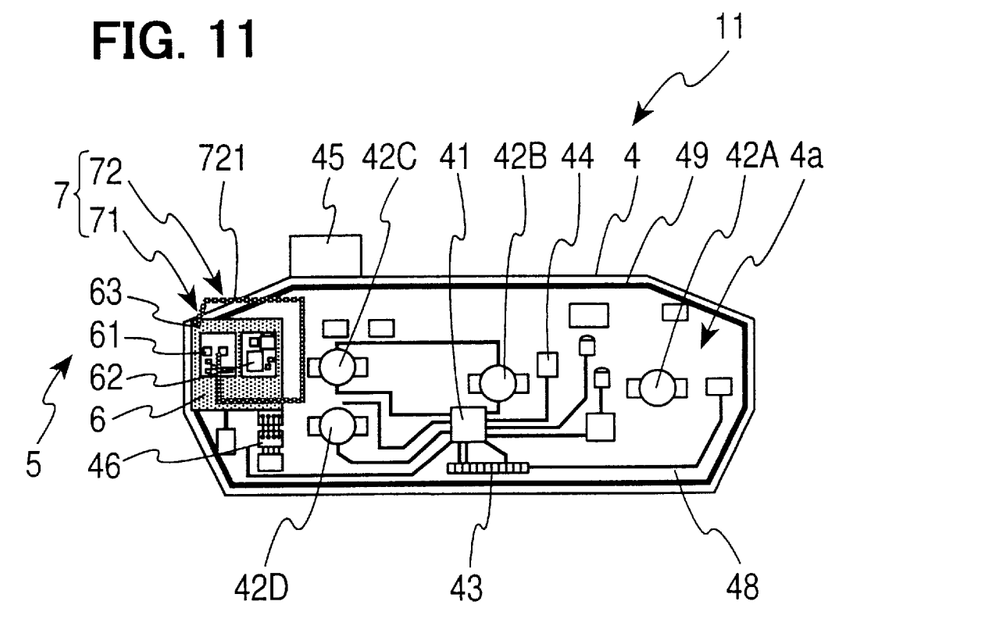
FIG. 11 is a rear view of the interior of the instrument panel unit, with a keyless entry receiver being incorporated, based on a second embodiment of this invention.

In the second embodiment shown in FIG. 11, the instrument panel unit 11 has the meter circuit board 4 which has along the rim thereof the formation of a radio signal receiving pattern 49 in a looped form. The antenna inlet 63 is located at the edge of the shorter side of the meter circuit board 4. This position is immediately above the signal receiving pattern 49.

Figure 12:
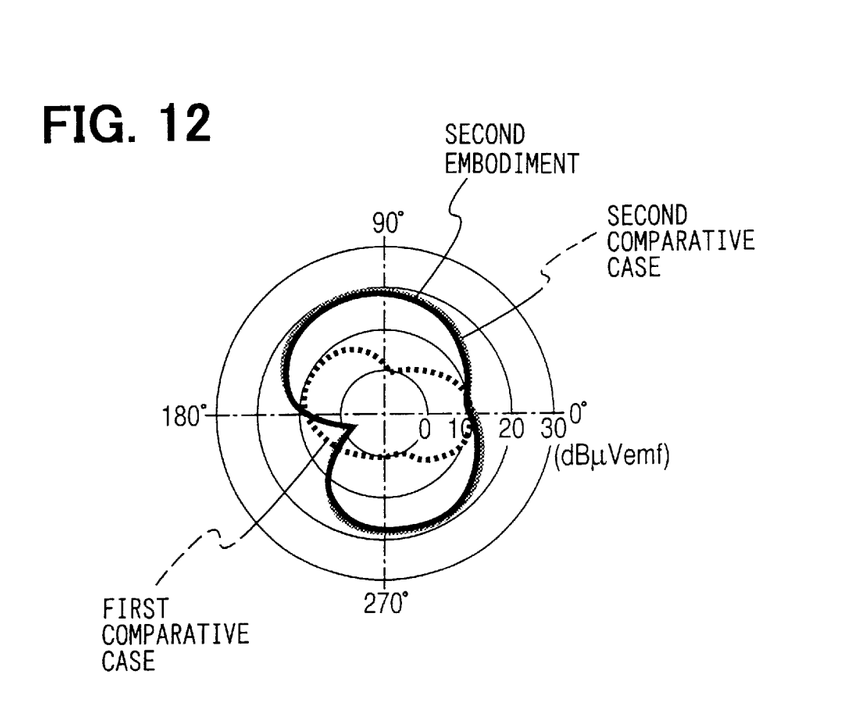
FIG. 12 is a diagram showing comparison of the antenna directivity patterns of the keyless entry receiver.
Figure 13A:
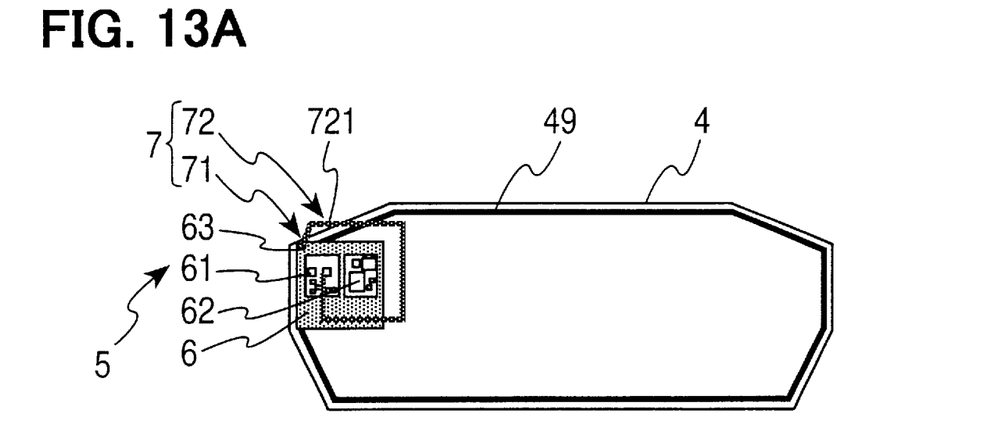
FIGS. 13A and 13B are rear views of the interior of the instrument panel unit of this invention and a comparative unit, respectively.
Figure 13B:
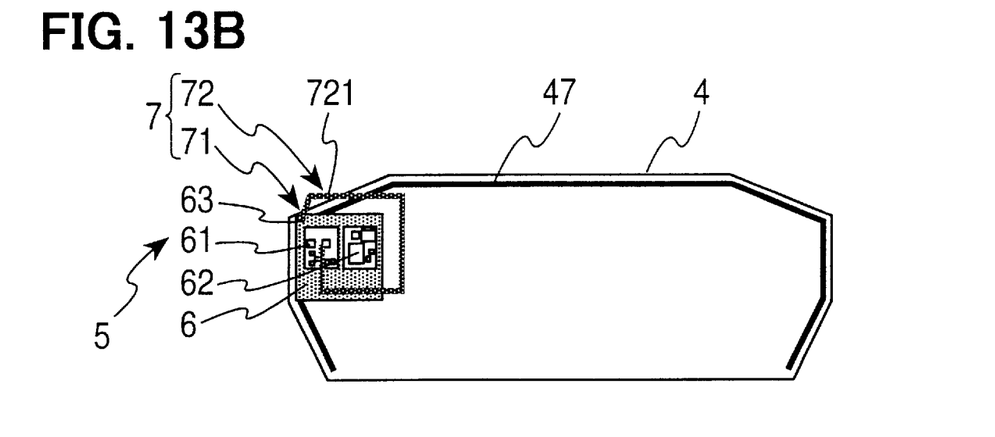

FIG. 12 shows the antenna directivity, comparing between the case of this embodiment where the looped signal receiving pattern 49 is formed and the case of a first subject, of comparison having a C-shaped signal receiving pattern. The signal receiving pattern 49 is formed along the rim of the meter circuit board 4 as shown in FIG. 13A, whereas the pattern formed on the meter circuit board 4 of the subject of comparison is a C-shaped pattern which is derived from the looped pattern, with the bottom segment being eliminated as shown in FIG. 13B.

The antenna directivity resulting from a second subject of comparison which has the formation of a metallic film on the entire surface of the meter circuit board is also shown in FIG. 12.

FIG. 12 reveals that the meter circuit board 4 achieves the higher antenna gain as compared with the first subject of comparison having no signal receiving pattern. The figure also reveals that the signal receiving pattern 49 of the meter circuit board 4 functions equivalently to the second subject of comparison having the formation of a metallic film on the entire surface.

This result is analyzed as follows. When the metallic film formed on the entire surface of the meter circuit board 4 works as antenna, the received radio signal causes a current to flow along the rim of the metallic film, i.e., along the rim of the meter circuit board 4. This situation is virtually identical to the formation of the signal receiving pattern 49 of the meter circuit board 4.

Accordingly, if a meter circuit board is intended to have the formation of a conductor film over the entire surface, it must have at least two pattern layers on both sides. Whereas, a circuit board with the formation of circuit patterns 47 and 48 on one side as in the case of the first embodiment can improve the signal receiving performance to the same extent as the entire conductor film by the additional formation of a signal receiving pattern even in case the pattern of meter circuit 4 is inferior to the entire conductor film.

Based on the location of the antenna inlet 63 immediately above the signal receiving pattern 49 and the coupling of the signal receiving pattern 49 to the antenna segment 721 of the highest current density, the antenna 7 and signal receiving pattern 49 couple tightly, whereby the antenna gain is enhanced. Moreover, based on the location of the antenna inlet 63 at the edge of the shorter side of the meter circuit board 4, the full length of the meter circuit board 4 can be utilized to provide an adequate antenna segment length, whereby the signal receiving performance can further be improved.

(Third Embodiment)

Figure 14:
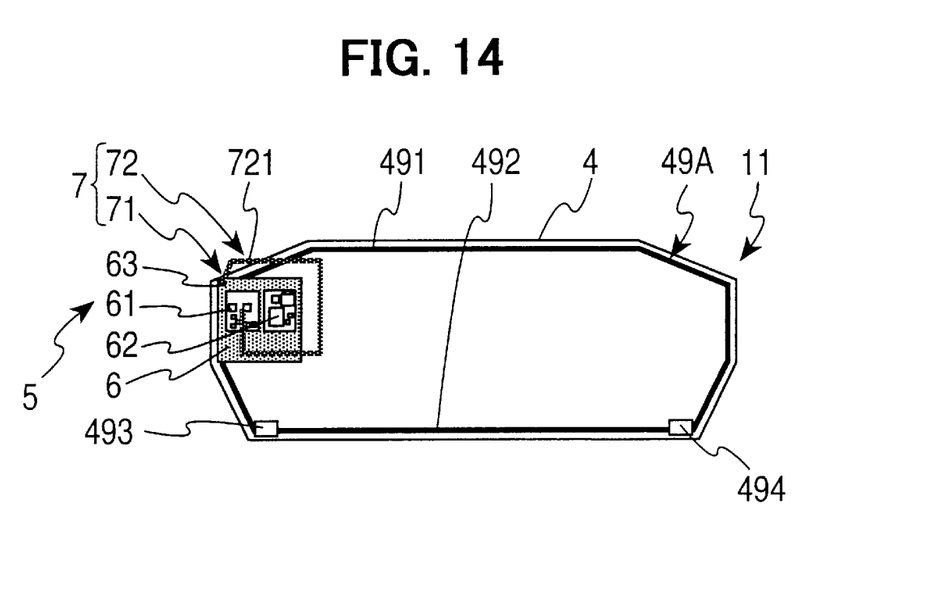
FIG. 14 is a rear view of the interior of the instrument panel unit, with a keyless entry receiver being incorporated, based on a third embodiment of this invention.

In the third embodiment shown in FIG. 14, the instrument panel unit 11 is similar to the second embodiment although a signal receiving pattern 49A is differentiated.

The signal receiving pattern 49A of this embodiment is laid along the rim of the meter circuit board 4, and it is cut at two positions into two pattern segments 491 and 492 and bridged at these cuts by capacitors 493 and 494. In consequence, the pattern 49A functions as a closed-loop pattern for the current created by the radio signal of the 300 MHz band from the keyless entry transmitter 12 in the same fashion as the second embodiment.

Accordingly, even if the formation of a looped pattern like that of the second embodiment is difficult due to the parts layout or the like, the signal receiving performance can be improved to the same extent as the second embodiment based on the bridging of pattern segments with capacitors.

(Fourth Embodiment)

Figure 15:
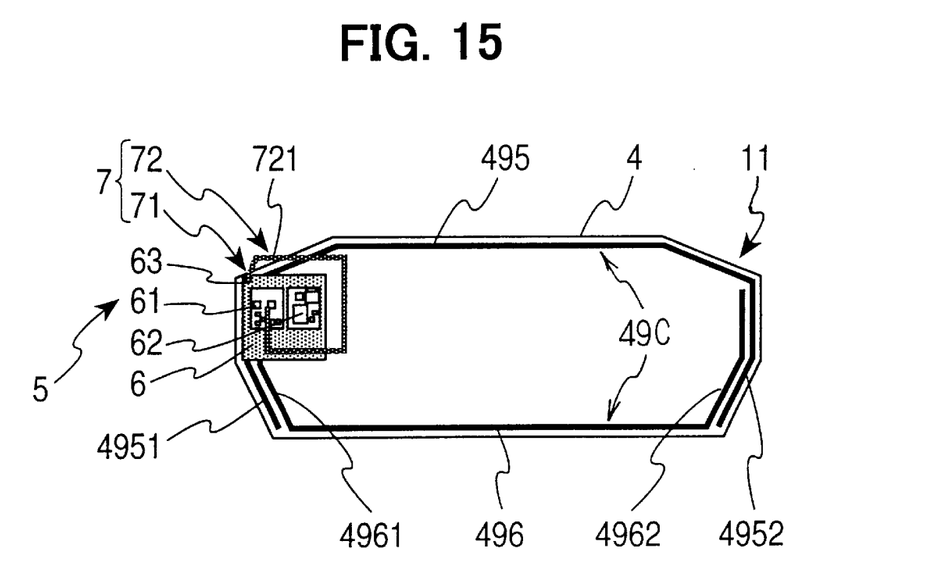
FIG. 15 is a rear view of the interior of the instrument panel unit, with a keyless entry receiver being incorporated, based on a fourth embodiment of this invention.

In the fourth embodiment shown in FIG. 15, the instrument panel unit 11 is slightly differentiated from the third embodiment in respect of the signal receiving pattern.

The signal receiving pattern 49C of this embodiment is laid along the rim of the meter circuit board 4. It has two C-shaped pattern segments 495 and 496. The pattern segment 495 extends along the upper edge of the meter circuit board 4 and has its both end sections 4951 and 4952 bent downward along the shorter sides of the board 4. The pattern segment 496 extends along the lower edge of the meter circuit board 4 and has its both end sections 4961 and 4962 bent upward along the shorter sides of the board 4. The end section 4951 of pattern 495 and the end section 4961 of pattern 496 are laid closely in parallel. The end section 4952 of pattern 495 and the end section 4962 of pattern 496 are laid closely in parallel. Accordingly, the meter circuit board 4 has its signal receiving pattern 49C doubled along the shorter sides.

The end sections 4951 and 4952 of pattern 495 and the end sections 4961 and 4962 of pattern 496 have the function of capacitors, which bridge the separate pattern segments 495 and 496 in a sense of RF circuit characteristics. Accordingly, the pattern segments 495 and 496 function as a closed-loop pattern for the current created by the radio signal of the 300 MHz band from the keyless entry transmitter 12 in the same fashion as the second embodiment. In consequence, the signal receiving performance can be improved to the same extent as the third embodiment without the need of using actual capacitors.

While the present invention has been explained for the embodiments of instrument panel unit having a keyless entry receiver, it is also applicable to instrument panel units having different radio signal receivers.

What is claimed is:

1. An instrument panel unit of a vehicle comprising:

a meter housing;

a display section provided in the meter housing to be viewed by a vehicle driver;

a meter circuit provided in the meter housing and formed on a meter circuit board; and a radio signal receiver provided in the meter housing and formed on a receiver circuit board connected with an antenna, wherein the receiver circuit board has an inlet for the antenna in one of two outer regions among longitudinally trisected regions of the meter circuit board.

2. An instrument panel unit of a vehicle comprising:

a meter housing;

a display section provided in the meter housing to be viewed by a vehicle driver;

a meter circuit provided in the meter housing and formed on a meter circuit board; and a radio signal receiver provided in the meter housing and formed on a receiver circuit board connected with an antenna, wherein the receiver circuit board has an inlet for the antenna at an upper side of the meter circuit board.

3. An instrument panel unit of a vehicle comprising:

a meter housing;

a display section provided in the meter housing to be viewed by a vehicle driver;

a meter circuit provided in the meter housing and formed on a meter circuit board; and a radio signal receiver provided in the meter housing and formed on a receiver circuit board connected with an antenna, wherein the antenna having segments which extend in parallel to a surface of the meter circuit board, with a part of the antenna segments nearer to the inlet being extended in a longitudinal direction of the meter circuit board.

4. An instrument panel unit of a vehicle comprising:

a meter housing;

a display section provided in the meter housing to be viewed by a vehicle driver;

a meter circuit provided in the meter housing and formed on a meter circuit board; and a radio signal receiver provided in the meter housing and formed on a receiver circuit board connected with an antenna, wherein the meter circuit board has a circuit pattern which is laid along a whole rim section of the meter circuit board to form a closed-loop radio signal receiving pattern at least with respect to RF circuit characteristics.

5. An instrument panel unit according to claim 4, wherein the signal receiving pattern is formed of a plurality of linear pattern segments, with the ends of adjacent pattern segments being connected by capacitors.

6. An instrument panel unit according to claim 4, wherein the signal receiving pattern is formed of a plurality of linear pattern segments, with the end sections of adjacent pattern segments being laid in parallel to each other thereby to rim double the meter circuit board at pattern segment end sections.

7. An instrument panel unit according to any of claims 4 to 6, wherein the inlet is located in the rim section of the meter circuit board.

8. An instrument panel unit according to claim 4, wherein the receiver circuit board has an inlet for the antenna in one of two outer regions among longitudinally trisected regions of the meter circuit board.

9. An instrument panel unit of a vehicle comprising:

a meter housing;

a display section provided in the meter housing to be viewed by a vehicle driver;

a meter circuit provided in the meter housing and formed on a meter circuit board; and a radio signal receiver provided in the meter housing and formed on a receiver circuit board connected with an antenna, wherein the receiver circuit board has an inlet for the antenna provided right above an electrically separated signal receiving pattern formed on the meter circuit board.

10. An instrument panel unit according to any of claims 1–4 or 9, wherein the receiver circuit board and the meter circuit board are arranged in parallel to each other.

11. An instrument panel unit according to any of claims 1–4 or 9, wherein the radio signal receiver is provided under a windshield glass of a vehicle and connected to a control device for a vehicle door or an engine to control a door operation or an engine operation in response to a radio signal transmitted from a transmitter.

* * * * *